US008661432B2

(12) United States Patent
Kriebel et al.

(10) Patent No.: US 8,661,432 B2
(45) Date of Patent: Feb. 25, 2014

(54) METHOD, COMPUTER PROGRAM PRODUCT AND SYSTEM FOR INSTALLING APPLICATIONS AND PREREQUISITES COMPONENTS

(75) Inventors: Sven Kriebel, Remchingen (DE); Dirk Degrell, Wiesloch (DE); Andreas Balzar, Heidelberg (DE)

(73) Assignee: SAP AG, Walldorf (DE)

( * ) Notice: Subject to any disclaimer, the term of this patent is extended or adjusted under 35 U.S.C. 154(b) by 493 days.

(21) Appl. No.: 12/898,496

(22) Filed: Oct. 5, 2010

(65) Prior Publication Data

US 2012/0084770 A1    Apr. 5, 2012

(51) Int. Cl.
*G06F 9/445* (2006.01)

(52) U.S. Cl.
USPC ............ 717/175; 717/174; 715/744; 715/749

(58) Field of Classification Search
USPC ................ 717/101–178; 705/50–418; 703/22
See application file for complete search history.

(56) References Cited

U.S. PATENT DOCUMENTS

| | | | | |
|---|---|---|---|---|
| 6,606,744 | B1 * | 8/2003 | Mikurak ........................ | 717/174 |
| 7,003,560 | B1 * | 2/2006 | Mullen et al. .................. | 709/223 |
| 7,415,438 | B1 * | 8/2008 | Berman et al. .................. | 705/38 |
| 7,624,086 | B2 * | 11/2009 | Keith, Jr. .......................... | 706/60 |
| 7,653,661 | B2 * | 1/2010 | Razvi et al. ..................... | 709/224 |
| 7,657,887 | B2 * | 2/2010 | Kothandaraman et al. ... | 717/176 |
| 7,756,822 | B2 * | 7/2010 | Danner et al. .................. | 707/602 |
| 7,925,568 | B2 * | 4/2011 | Cullen et al. ..................... | 705/37 |
| 8,209,679 | B2 * | 6/2012 | Long ............................. | 717/173 |
| 2002/0178054 | A1 * | 11/2002 | Ader ............................... | 705/14 |
| 2003/0014335 | A1 * | 1/2003 | Lecheler-Moore et al. .... | 705/30 |
| 2003/0033155 | A1 * | 2/2003 | Peerson et al. ..................... | 705/1 |
| 2003/0120529 | A1 * | 6/2003 | Honarvar et al. .................. | 705/7 |
| 2004/0039681 | A1 * | 2/2004 | Cullen et al. ..................... | 705/37 |
| 2004/0051740 | A1 * | 3/2004 | Reichel et al. ................. | 345/789 |
| 2004/0064349 | A1 * | 4/2004 | Humenansky et al. ........... | 705/7 |
| 2004/0123287 | A1 * | 6/2004 | Fox et al. ....................... | 717/176 |
| 2004/0236667 | A1 * | 11/2004 | Cotton ............................. | 705/37 |
| 2005/0055368 | A1 * | 3/2005 | Bruening et al. .............. | 707/102 |
| 2005/0120051 | A1 * | 6/2005 | Danner et al. ............. | 707/104.1 |

(Continued)

FOREIGN PATENT DOCUMENTS

WO    WO 2006096812 A2 * 9/2006

OTHER PUBLICATIONS

SAP® NetWeaver Business Warehouse: Administration and Monitoring; Olaf Klostermann and Milco Österholm; Galileo Press; Bonn—Boston; Dec. 4, 2009.*

(Continued)

*Primary Examiner* — Lewis A Bullock, Jr.
*Assistant Examiner* — Francisco Aponte
(74) *Attorney, Agent, or Firm* — Fish & Richardson P.C.

(57) ABSTRACT

A computer program product is tangibly embodied in a computer readable storage medium and comprises instructions that when executed by a processor perform a method including: presenting business category identifiers to a user in a computer system, each business category identifier representing one of multiple reporting content bundles for configuring a transactional application and an analytical application; receiving, in the computer system, a selection by the user of at least one of the business category identifiers; and installing in the computer system, from the selected reporting content bundle, at least one transactional content object in the transactional application, and at least one analytical content object in the analytical application.

18 Claims, 5 Drawing Sheets

(56) References Cited

U.S. PATENT DOCUMENTS

| | | | |
|---|---|---|---|
| 2005/0144114 A1* | 6/2005 | Ruggieri et al. | 705/37 |
| 2006/0020641 A1* | 1/2006 | Walsh et al. | 707/203 |
| 2006/0053384 A1* | 3/2006 | La Fetra et al. | 715/765 |
| 2006/0085764 A1* | 4/2006 | Klementiev | 715/853 |
| 2006/0174243 A1* | 8/2006 | Brewer et al. | 717/174 |
| 2006/0190486 A1* | 8/2006 | Zhou et al. | 707/104.1 |
| 2006/0242160 A1* | 10/2006 | Kanchwalla et al. | 707/100 |
| 2007/0016557 A1* | 1/2007 | Moore et al. | 707/3 |
| 2007/0022386 A1* | 1/2007 | Boss et al. | 715/764 |
| 2007/0038642 A1* | 2/2007 | Durgin et al. | 707/10 |
| 2007/0088667 A1* | 4/2007 | Schwarz et al. | 707/1 |
| 2007/0157096 A1* | 7/2007 | Keren et al. | 715/760 |
| 2007/0250361 A1* | 10/2007 | Hazy | 705/7 |
| 2008/0004929 A9* | 1/2008 | Raffel et al. | 705/8 |
| 2008/0120129 A1* | 5/2008 | Seubert et al. | 705/1 |
| 2008/0134220 A1* | 6/2008 | Weiss et al. | 719/329 |
| 2008/0162546 A1* | 7/2008 | Razvi et al. | 707/103 R |
| 2009/0006156 A1* | 1/2009 | Hunt et al. | 705/7 |
| 2009/0018935 A1* | 1/2009 | Neumaier et al. | 705/30 |
| 2009/0187822 A1* | 7/2009 | Abreu et al. | 715/700 |
| 2009/0327106 A1* | 12/2009 | Bartelt et al. | 705/30 |
| 2010/0175060 A1* | 7/2010 | Boykin et al. | 717/173 |
| 2010/0287530 A1* | 11/2010 | MacLean et al. | 717/105 |
| 2013/0167138 A1* | 6/2013 | Ekka et al. | 717/175 |

OTHER PUBLICATIONS

A Framework for Simulating Combined OLTP and OLAP Workloads—Anja Bog, Mathias Domschke, Juergen Mueller, Alexander Zeier, Hasso Plattner Institute at University of Potsdam Germany—Oct. 21-23, 2009.*

Jain, "Activating the Standard BI report," *SAP AG*, Nov. 16, 2009, 17 pages.

SAP AG, "762: BI Retail: Integration and Content Activation: Building Block Configuration Guide," *SAP Best Practices*, 2009, 49 pages.

SAP AG, "S00—SRM—Technical Basis Configuration: Bu ilding Block Configuration Guide," *SAP Best Practices*, Mar. 2010, 22 pages.

SAP AG, "CRM Marketing Master Data (C11): Building Block Configuration Guide," *SAP Best Practices*, Mar. 2009, 22 pages.

Gerber, "mySAP ERP for High Tech: Industry Business Unit High Tech," *SAP AG*, 2005, 99 pages.

* cited by examiner

FIG. 4

| Content Bundle | Edit | Goto | Extras | System | Help | | | |
|---|---|---|---|---|---|---|---|---|

METHOD, COMPUTER PROGRAM PRODUCT AND SYSTEM FOR INSTALLING APPLICATIONS AND PREREQUISITES COMPONENTS

TECHNICAL FIELD

This invention relates to installing analytical content.

BACKGROUND

Enterprise software can manage, record, and facilitate transactions in an enterprise system. Components of enterprise software can be distributed between hardware devices and virtual environments, as well as across geographic locations. Some enterprise software is designed for reuse, and contains components that are designed to meet general business needs.

One or more devices in a system can be involved in gathering, generating, processing, and storing transactional information. For example, the sales documentation, customer files and accounting records of an organization are handled at least in part by one or more transactional applications in a transactional system.

The transactional information can be used to generate one or more reports, which are generally targeted to a specific group (e.g., executive sales reports are intended for persons in the company's management). Sometimes an analytical system is used in conjunction with the transactional system(s), wherein transactional data is forwarded to (or obtained by) the analytical system and used in compiling the report(s).

SUMMARY

The invention relates to installing analytical content.

In a first aspect, a computer program product is tangibly embodied in a computer readable storage medium and comprises instructions that when executed by a processor perform a method including: presenting business category identifiers to a user in a computer system, each business category identifier representing one of multiple reporting content bundles for configuring a transactional application and an analytical application; receiving, in the computer system, a selection by the user of at least one of the business category identifiers; and installing in the computer system, from the selected reporting content bundle, at least one transactional content object in the transactional application, and at least one analytical content object in the analytical application.

Implementations can include any or all of the following features. The method further includes: logging activation of any content objects from the selected reporting content bundle; and presenting to the user a log of the activated content objects, including an activation status. The method further includes: identifying available systems to the user as possible targets for the installation; and receiving another selection from the user of at least one of the available systems, wherein the installation is performed in the selected available system. The method further includes: simulating the installation upon user request, before the transactional content object and the analytical content object are installed; and displaying a result of the simulation. The method further includes: receiving a user input specifying how the installation should handle at least one content object that has previously been installed in the transactional application or the analytical application.

The method further includes: generating the reporting content bundles based on a specification made by at least one developer; performing a consistency check on at least one of the generated reporting content bundles; and presenting the developer with a result of the consistency check. The developer makes the specification using a bundle workbench screen that allows for adding, deleting, and organizing content objects for each bundle.

The method further includes: receiving an input from the developer specifying that one or more of the content objects as being local to the installation, wherein the local content object is initiated in a client of the analytical application. The method further includes: simulating the installation upon request from the developer, before the transactional content object and the analytical content object are installed; and displaying a result of the simulation to the developer. The developer's specification further defines a system or software requirement for installing at least one of the reporting content bundles.

In a second aspect, a computer program product is tangibly embodied in a computer readable storage medium and comprises instructions that when executed by a processor generate a graphical user interface comprising: content bundle selection area presenting business category identifiers to a user in a computer system, each business category identifier representing one of multiple reporting content bundles for configuring a transactional application and an analytical application; and a first input control for receiving a selection by the user of at least one of the business category identifiers, and for initiating installation, from the selected reporting content bundle and in response to the selection, of at least one transactional content object in the transactional application, and at least one analytical content object in the analytical application.

Implementations can include any or all of the following features. The graphical user interface further includes: a system identification area identifying available systems to the user as possible targets for the installation; and a second input control for receiving another selection from the user of at least one of the available systems, wherein the installation is performed in the selected available system. The graphical user interface further includes: a second input control for initiating simulation of the installation before the transactional content object and the analytical content object are installed. The graphical user interface further includes: a second input control for the user to specify how the installation should handle at least one content object that has previously been installed in the transactional application or the analytical application.

In a third aspect, a computer system includes: a computer-readable storage medium having stored therein: a transactional application; an analytical application; and reporting content bundles for configuring the transactional application and the analytical application. The computer system includes a processor that upon user selection of at least one of the reporting content bundles installs, from the selected reporting content bundle, at least one transactional content object in the transactional application, and at least one analytical content object in the analytical application.

Implementations can include any or all of the following features. The content bundles are organized according to business categories. The computer system further includes a graphical user interface configured for receiving a user input specifying how at least one content object that has previously been installed in the transactional application or the analytical application should be handled. The computer system further includes a graphical user interface configured for a developer to specify how the reporting content bundles should be generated, the graphical user interface further configured for initiating a consistency check on at least one of the reporting content bundles and presenting the developer with a result of the consistency check.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 is an example user interface for creating a content bundle.

Like reference symbols in the various drawings indicate like elements.

DETAILED DESCRIPTION

In some examples described herein, a software system containing transactional and analytical applications can be installed or deployed based on business categories selected by a user, such as a business analyst. For example, transactional and analytical objects can be bundled together to ensure that the correct objects are installed, and properly associated with each other, for a particular implementation. The business categories applied to various bundles can be defined according to the way the applications are to be used in the company's business, for example according to the type of accounting an organization uses or the types of inventory handled.

Transactional applications can be used to manage business activities for an organization, and analytical applications can be used to record and examine those business activities. For some transactional applications, multiple analytical applications may be available. Some or all of these analytical applications have software prerequisites, which may be either transactional or analytical software objects. Selection of an analytical application for installation can cause a computer system to identify and install the necessary prerequisite software objects.

Figure 1:
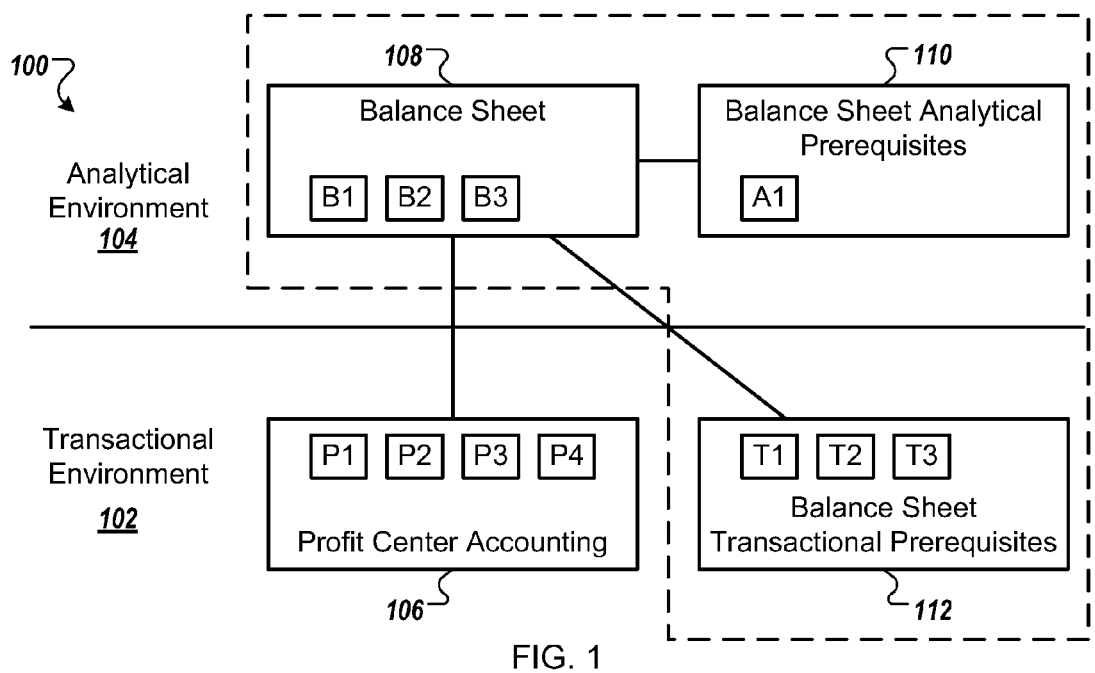
FIG. 1 is a block diagram of an example computer system from an application view.

FIG. 1 is a block diagram of an example computer system 100 from an application view. The components of the computer system 100 in this example are grouped and organized according to the type of functionality provided. Components that are structured or developed differently can be grouped together. For example, the computer system 100 can be used by a company or other organization for transacting its business. The system 100 can be implemented using one or more computer-based devices, such as a server.

The components in the computer system 100 are written in an appropriate computer language, such as the Advanced Business Application Programming (ABAP) language used in products from SAP AG. Business suite applications, such as a profit center accounting application 106, can be installed and deployed in a transactional environment 102. The transactional environment 102 may be generated using computer server(s) that may be remotely or locally located. In this example, the profit center accounting application 106 can provide users with graphic interfaces, data collection, and transactional logic related to performing accounting services for one or more profit centers (e.g., for a company division or a wholly-owned subsidiary). The profit center accounting application 106 here includes components labeled P1-P4, such as, but not limited to: libraries, scripts, plug-ins, and/or other components used for profit center accounting.

Analytic elements that support analysis of the profit center accounting application 106 can be installed and deployed in an analytic environment 104. The analytic content can include configuration data and libraries delivered in different software components than transactional applications. Some or all of the analytical content may be optional for purposes of the profit center accounting application 106. That is, the profit center accounting application 106 may be used; and any, some, or none of available analytical components may be used. In addition to installation, analytic elements must be activated to be used. This activation can include linking to appropriate transactional applications, user specific customization (how often to run a report, the kinds of data to consider, etc.), and installation of prerequisite software objects.

In the computer system 100, the profit center accounting application 106 is installed in the transactional environment 102. A balance sheet application 108 is to be installed, for example in response to a user selecting a balance sheet bundle in a content activation user interface. The components of balance sheet application 108, as well as a balance sheet analytical prerequisites application 110 and a balance sheet transactional prerequisites application 112 may be bundled together in a balance sheet bundle associated with the profit center accounting application 106. The applications 108-112 can include components B1-B3, A1, and T1-T3, respectively. These software components can be designed, developed, and stored in memory according to design factors, and some or all components may also be associated with other applications in other bundles.

Some or all of the applications 108-112 may be hidden from the user that selects the balance sheet bundle. For example, the balance sheet analytical prerequisites application 110 and the balance sheet transactional prerequisites 112 may be hidden from the user, and all information may be logged and displayed in reference to installation and deployment of the balance sheet application 108. Alternatively, when the balance sheet application 108 or the profit center accounting application 106 is installed, installation and deployment information for the balance sheet analytical prerequisites 110 and the balance sheet transactional prerequisites 112 may be automatically supplied to the user.

Returning now to the transactional environment 102 and the analytical environment 104, some implementations of the transactional environment 102 may be in a computer system local to a business user and the analytical environment 104 may be remote from the business user. This distinction may be transparent from the business user, and the environment in which a particular component or application resides may not be specified. For example, a web portal or client may provide a unified interface for applications in both the transactional environment 102 and the analytical environment 104.

The transactional environment 102 may contain some applications that are often used. For example, applications that support everyday tasks such as processing sales may be appropriate for installation in the transactional environment 102. The analytical environment 104, in contrast, may contain one or more applications used less often than those in the transactional environment 102. For example, an application to generate a monthly or yearly balance sheet may be installed in the analytical environment 104. Some applications, such as those used for analytical purposes, but used often, may be installed and deployed in the transactional environment 102 but associated with an analytical application. For example, the balance sheet transactional prerequisites application 112 can include functionality to determine and display the current balance in a particular account with live updates as the balance changes.

Following are two examples of installation and deployment of transactional and analytical bundles in the system 100. In the first example, a business user is beginning to use the system 100 to handle currency conversion. The business user installs a currency conversion transactional application in the transactional environment 102. The currency conversion application processes data that may later be used for reporting by one or more analytical applications. After installation, deployment, and verification of the currency conversion application, a cash flow bundle can be selected by the business user from a list of available reporting bundles. Using the selected cash flow bundle, the computer system 100 can install a cash flow application and analytic prerequisites in the analytical environment 104, and can install transactional prerequisites in the transactional environment 102.

In the second example, a business user is configuring the system 100 to handle inventory shipments between distribution centers to fulfill customer orders. This process can be compartmentalized into a series of steps. Each step can be completed using a transactional application configured to receive input from a previous transactional application and/or user input. The first step can be accomplished with a transactional application to find the location of all merchandise with a particular product number. A product location analytical application can be bundled with the merchandise location application. This product location analytical application can produce a report used by the next step of the inventory shipment process. When the business user selects the product location transactional application for installation and deployment, the bundled analytical applications can be installed with little or no additional user input required.

Figure 2:
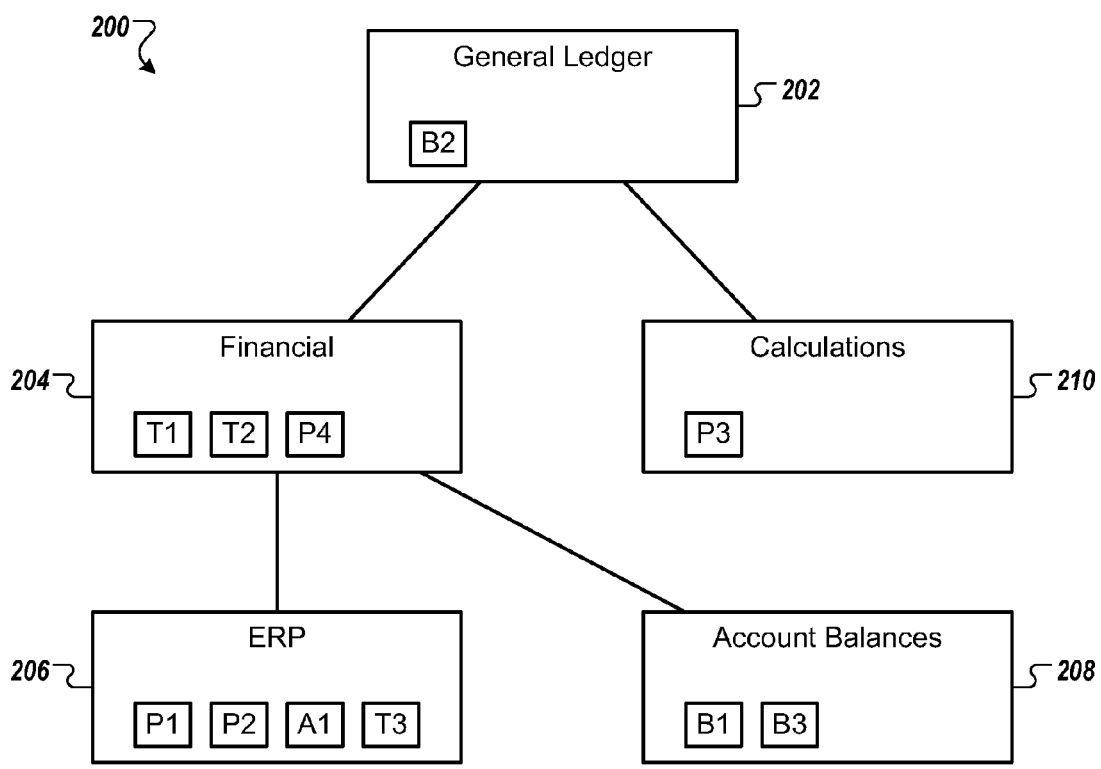
FIG. 2 is a block diagram of an example computer system from a hierarchical view.

FIG. 2 is a block diagram of an example computer system 200 from a hierarchical view. The computer system 200 can include some or all of the same components as the computer system 100 (i.e. P1-P4, B1-B3, A1, and T1-T3). These components are organized in the computer system 200 according to a design hierarchy, such as class inheritance or object namespace.

Figure 3:
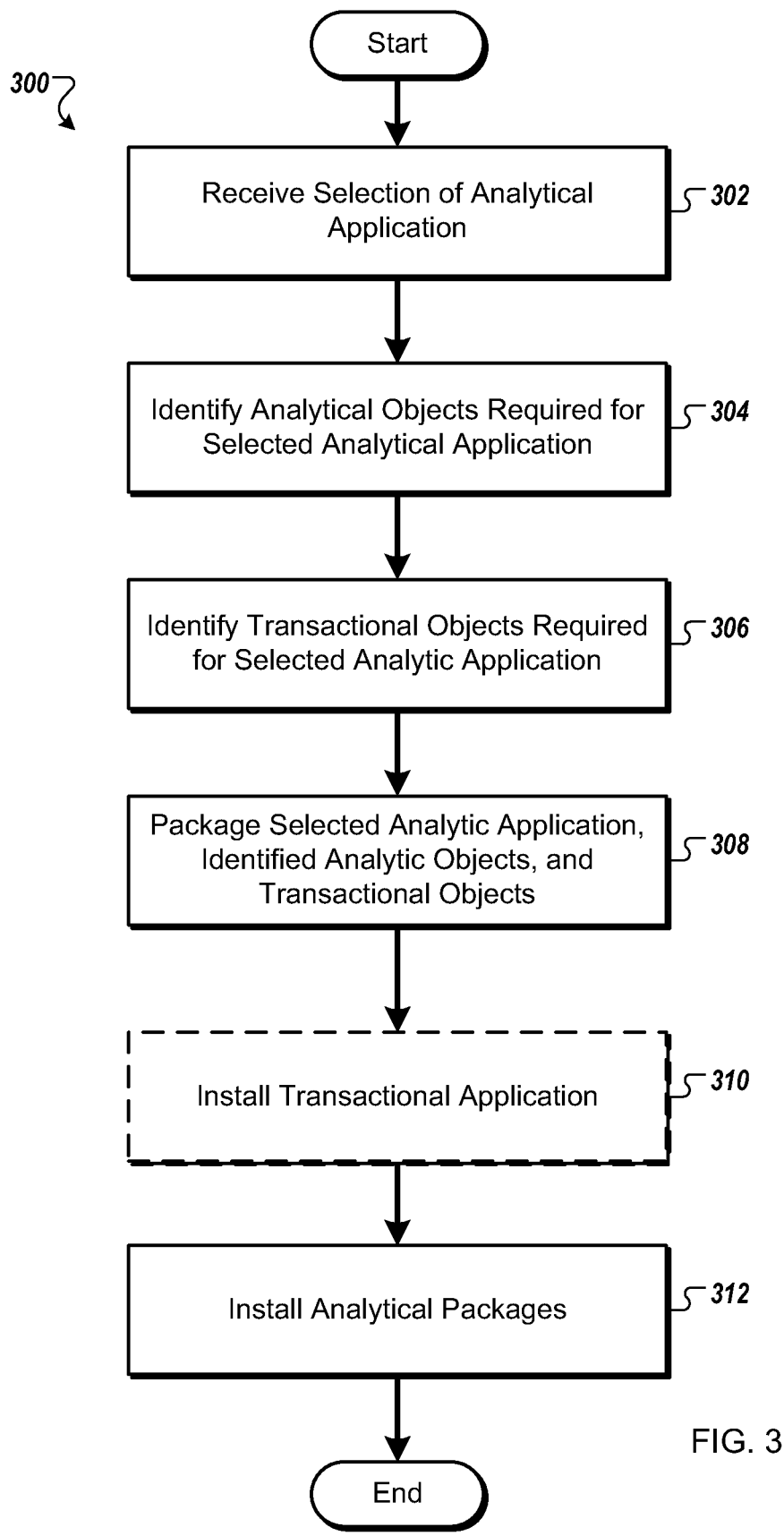
FIG. 3 is a flowchart of an example process of deploying software.

A general ledger category 202 can contain the element B2. B2 is an element that can be useful or generalized to all general ledger type objects, or that can't be more specifically categorized. Under the general ledger category 202 are the financial category 204 and the calculations category 210. These two categories are more specific types of operations in the general ledger category 202, or extensions thereof. For example, element T1 may be a daemon to observe an account balance, T2 a library providing access to the T1 daemon, and P4 an object with functions to credit or debit an account. These elements may share some functional similarities and may be grouped together in the hierarchical view to aid in design, development and/or cataloging FIG. 3 is a flowchart of an example process 300 of deploying software. The process 300 can be performed by, for example, the computer system 100. The process 300 can be used to install an analytical application associated with a transactional application. For example, the installing user can choose between component bundles to select the proper configuration of the system.

Selection of one or more analytical applications can be received (302). In some examples, the selection by a business user of an application bundle can include an indication of analytical applications. The business user may alternatively or additionally select analytical applications, such as from a list of available analytical applications for a transactional application that is currently installed on the business user's computer system. The selection of an analytical application may be made from a presentation of business category identifiers representing one of multiple reporting content bundles.

Analytical objects (304) and transactional objects (306) required for the selected analytical application are identified. These required objects, sometime called dependencies, can include, but are not limited to: drivers; header files; libraries; and data processing, normalizing, or aggregating applications to be installed in an analytical environment. In some examples, a list of required prerequisites can be compared to installed components on a target computer system, and only components not found to be installed may be identified. Some objects may be required for the selected analytical application, but without installation in transactional or analytical environment specified. These objects can be assigned to either or both in steps 304 and 306, for example based on the state of the target computer system or input from the business user. Input from the business user may specify the way the analytical application is to be used (e.g., how often a measurement is to be taken). In some examples, all analytical and transactional objects associated with the selected analytical application are identified without comparison with a user's system. For example, this list is made before distribution of the selected analytical application and used for all users.

The selected analytical application, identified analytical objects, and the identified transactional objects are packaged (308). In some implementations, the created package can be in multiple files or parts. For example, the analytical application and objects can be in one package, and the transactional objects can be in a second package. The structure and organization of package may depend in part on the configuration of the computer system to which they will be deployed. The status of the package or packages can be presented to a business user as a single report organized by function, as opposed to by file, object, application name, or place in a development hierarchy.

A transactional application can be installed (310) in a transactional environment, which may be on computer hardware local to the business user. The transactional application can be installed based on a selection made by a business user in the step 302. In some configurations, the step 310 can be performed earlier, such as before the step 308

The analytical application packages are installed (312) in the analytical and transactional environment. Dependencies of the analytical application can fulfilled by the contents of the packages, and the analytical application can be in a state ready to be configured and executed. A log of the installation, for example a listing of commands, inputs, and outputs, and activation statuses can be generated during the installation and presented to the user after installation.

Figure 4:
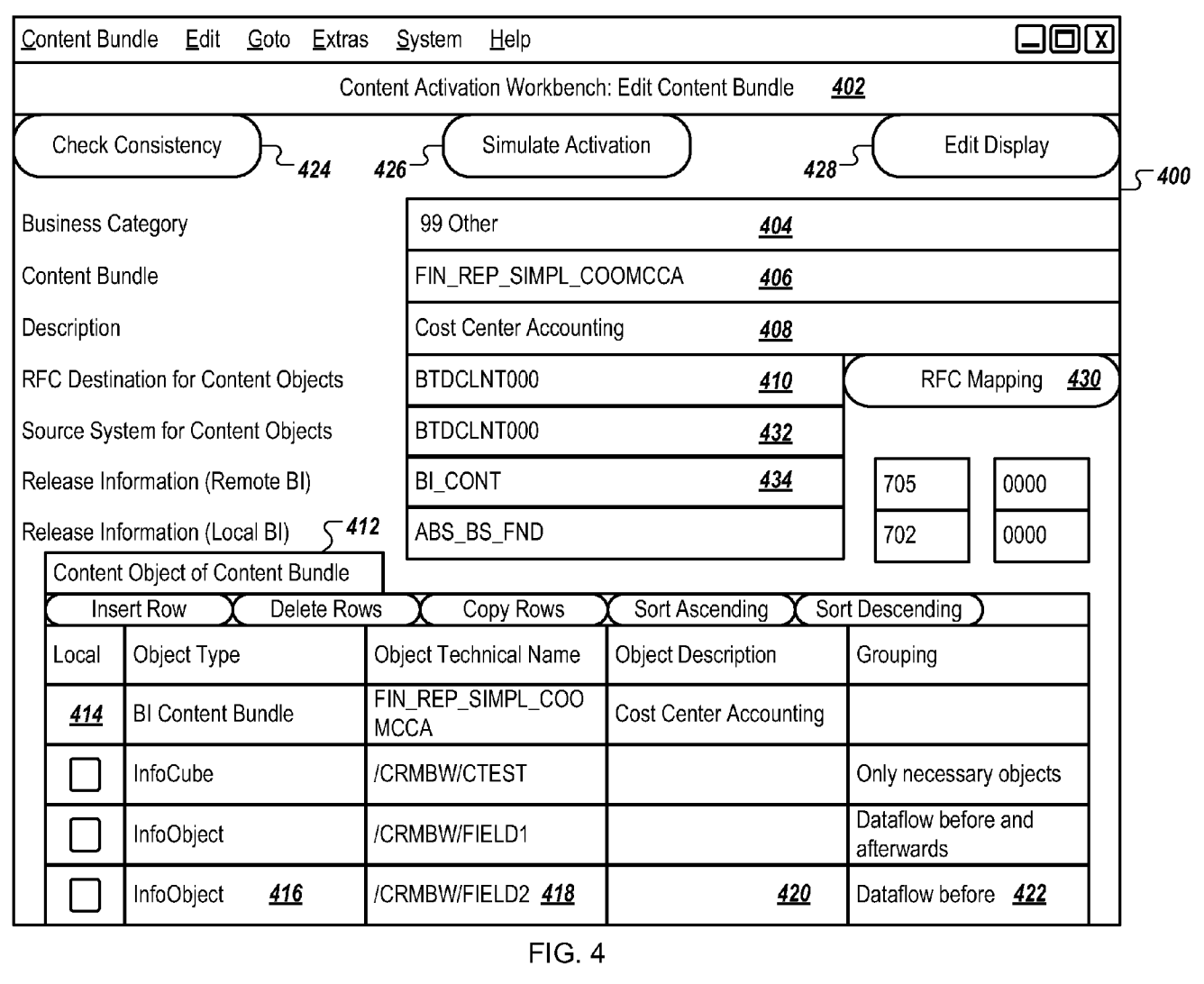

FIG. 4 is an example user interface 400 for creating a content bundle. A content bundle can be created by organizing existing objects, which can be identified by technical names, into a business category. Descriptions of the content bundles can be created to clarify the usage scenario of a content bundle. The user interface 400 can be used by, for example, a content developer responsible for organizing and simplifying technical information for non-technical user. The content developer may have a comprehensive understanding of the technical aspects of a content bundle, but need not have the same level of understanding of all of the specific business environments in which the content bundles may be used.

In the user interface 400, a display 402 has a title which can differ according to what action a user performed on a previous screen to initiate the user interface 400. For example, the display 402 may be labeled "Create", "Display", "Edit" or "Copy". In a display 404, a business category name can indicate the business category selected on the previous screen. In a display 406, a content bundle name can show the technical name of the content bundle selected on the previous screen. The user may be prompted for the content bundle name when the user interface 400 is launched. The displays 404-406 can be read-only elements that may not be modifiable by a user.

In a text box 408, a description of the content bundle can be entered or presented. The text box 408 can be write enabled or read only, for example based on the type of command (e.g., "Display", "Show Detail") used to launch the user interface 400. In a text box 410, a user can specify a remote function call destination for the displayed content bundle. The text box 410 may be optional (but recommended). Here the user may enter the remote function call destination, in a development system, where the content objects to be bundled reside. This may only be needed to provide help for technical names of content objects and to display descriptions of content objects in a table 412. The text box 410 may be examined by the user interface 400 after clicking a "Check Consistency" button 424. The remote function call destination may also point to the analytical client on a local system.

In the table 412, the user can identify the content objects to be contained in the content bundle identified in the user interface 400. Buttons on top of the table can enable the user to insert, delete and copy selected rows and to sort entries in the table according to a selected column. For the delete and copy functionality the table can provide multi-row selection functionality In this example, a column 414 is labeled "Local" and allows a user to indicate whether a content object shall be a local content object or not. By default the check boxes may be empty. one or more content object marked as local can be designated to install locally in a client of the content bundle when the content bundle is activated for installation.

In a column 416, labeled "Object Type", a user can specify the object type of the content object (e.g. Query, Info Cube, Crystal Report, etc.). An object type called "BI Content Bundle" (i.e., Business Intelligence Content Bundle) can enable cascading content bundles, as shown. This field may be mandatory for any content bundle shown in the user interface 400. For rows with "BI Content Bundle" selected, the local column 414 and a grouping column 422 can be disabled. In some configurations, content bundles can be nested up to a depth of ten. If the nesting is deeper, a run-time error may be produced during content activation. The "Check Consistency" button 424 can check this setting.

In a column 418, labeled "Object Technical Name", a user can specify the technical name of a content object. This column may be mandatory for any content bundle shown in the user interface 400.

In a column 420, labeled "Object Description", a description of the selected content objects can be shown. This description can be retrieved in the logon language either from the analytical client of the local system (in case of local objects) or from a remote function call system, to name a few examples. The field can be empty, for example in the case when no remote function call destination has been determined, or when no description is found. The column 420 can be read only; such as after clicking the "Check Consistency" button, or in case the object is a BI Content Bundle.

In a column 422, labeled "Grouping", a dropdown list box in each field or other control can be used to select from different options including, but not limited to:
Only Necessary Objects
Data Flow Before
Data Flow Afterwards
Dataflow Before and Afterwards
Not Applicable The fields in the column 422 may be mandatory. In case of included BI Content Bundles, the value can be "Not Applicable".

A button 424 labeled "Check Consistency", upon activation, can trigger a check whether the technical name of the content bundle is unique in the business category, whether a description has been entered for the content bundle, or whether the entries in the content objects table are valid. The results of these consistency checks can be displayed to a user and/or added to a log.

A button 426 labeled "Simulate Activation", upon activation, can determine the correctness of the content bundle definition. The result of the determination can be displayed to a user, or added to a log. This button can also provide a link to an "Activate Content Bundle" user interface, such as the user interface 400. A button 428 labeled "Edit Display", upon activation, can switch the user interface 400 between a display mode (e.g., text fields turned into read-only display labels) and an edit mode, shown here. A button 430 labeled "RFC Mapping", upon activation, can launch a user interface to maintain a mapping of dialog and background remote function call connections.

In a text box 432 a user can specify a source system that is used for help screen filtering of content objects in the column 418. If the field is empty, the local logical system can be used. If no source system can be found for the remote function call specified in the remote function call in the text field 410, a warning dialog can be displayed. In a text box 434, a user can specify the software component and minimum release requirements for a content bundle. The values can be checked before activation. The release/support package fields can be filled automatically based on the software component in the table 412, and/or the values can be changed by the user.

Figure 5:
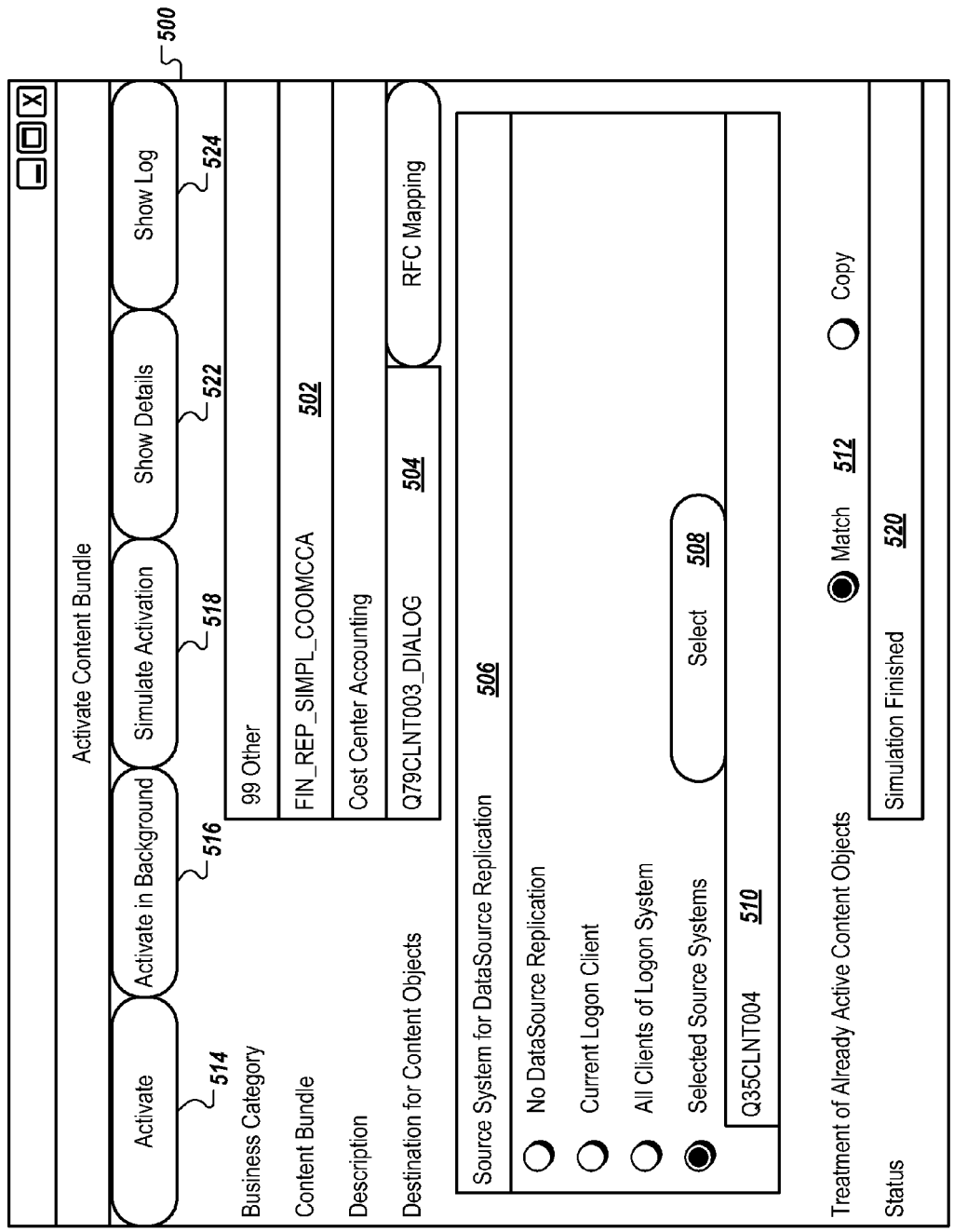
FIG. 5 is an example user interface for installing a content bundle.

FIG. 5 is an example user interface 500 for installing a content bundle. The user interface 500 can be presented to a user to select, test, and install a content bundle. Content bundles may be presented first by business category, and then by content bundle name and description. This allows a user to identify a content bundle by matching a business use or need. The user interface 500 can be used by, for example, a business analyst responsible for determining enterprise software solutions for a business. This business analyst may have a comprehensive understanding of the business needs and environment, but need not necessarily have the same level of understanding of software development and deployment techniques.

In the user interface 500, a display 502 can show a business category, technical name, and description of the content bundle that has been selected by a user on a content bundle overview screen. The content bundle overview screen can present a searchable list of business categories, technical names, and descriptions for available bundles, as well as those bundles current status in a computer system (e.g., installed, not installed, installation or operation log available, etc.). Business categories can contain multiple content bundles.

In a text box 504, a user can specify the destination of where the content is to be activated. A help for the existing destinations may be available to provide a list of optional destinations or description of a currently selected destination, from which a user may select a destination. The help may list only those connections in the installation system for which a remote function call mapping has been maintained. The field may not be mandatory and can be used for filtering the available log files the user can select for display or deletion. The adjacent RFC Mapping button can be activated to launch a screen from which remote function calls may be mapped.

In a frame 506, a user can select if data sources are to be replicated and if so from where. Default may be set to 'Current Logon Client,' for example as long as the activation has not been scheduled. Alternatively, the selected source systems can be collected from the last activation run for the given connection.

A button 508, upon activation, can present the option to selected source systems' to the user. The user can be provided in a popup with a list of source systems maintained in the target system (i.e. the system the destination for content activation points to). Relevant source systems can be displayed (non-relevant connections like external file can be suppressed). The user may then select a single system or multiple systems in the table on the left hand side and move them to the 'Selected Source Systems' table on the right hand side by using the buttons between the tables. Alternatively, the user is able to remove systems from the 'Selected Source Systems' table.

A display 510 shows a selected source system for data source replication. The technical names of these source systems can be displayed in comma separated format in this field. In some cases, more source systems may have been selected than can be displayed in the field. The last displayed entry may be followed by ' . . . ' in order to indicate there are more systems. In order to see all selected source systems the user then may click the 'Select' button to display the popup. In radio buttons 512, a user may select how already active content objects will be handled, for example overwritten by the activation (option 'Copy') or a merge shall be executed (option: 'Match').

A user may choose to install the selected content bundle, or to simulate the installation, for example to test for errors. A button 514 labeled 'Activate', upon activation by a user, can start the activation of the content bundle online. A button 516 labeled 'Activate in Background', upon activation by a user, can start the activation of the content bundle in the background, for example freeing the user interface 500 while the content bundle in activating. A button 518 labeled 'Simulate Activation' can expand the content bundle and write the objects found into the log file, grouped by grouping mode and local content. It may not trigger the activation simulation, but can check the correctness of the bundle and if the objects exist. The results of the simulation may be present to a user, or stored in an activation log. This simulation may be executed before installation of the content bundles, for example to determine if the content bundle will install as a user expects.

A display 520 can show status of the activation process is displayed in the 'Status' box. Possible status notifications include:
Activation not yet started.
Activation in process.
Activation finished with errors.
Activation finished.
Simulation finished with errors.
Simulation finished.
QM status set manually
In cases where the activation process does not finish and the status does not get updated to either "Activation finished with errors" or "Activation finished", the user may set the status manually which can order to re-start the activation. In case an activation process for the selected content bundle has been started in a prior session the status of the last activation process can be displayed.

A button 522 labeled "Show Details", upon activation, can bring the user to a 'Display Content Bundle' screen, such as the user interface 400. The user can view a table with the local object checkbox, the content type, the content object (technical name and description), and grouping information. A button 524 labeled "Show Log", upon activation, can bring a user to a "Log Viewer" screen, for example after at least one activation process has been finished for the selected content bundle (either with or without errors). From the "Log Viewer" screen, a user can select a log from a list of recorded logs, including the log of the most recent activation or activation simulation.

Figure 6:
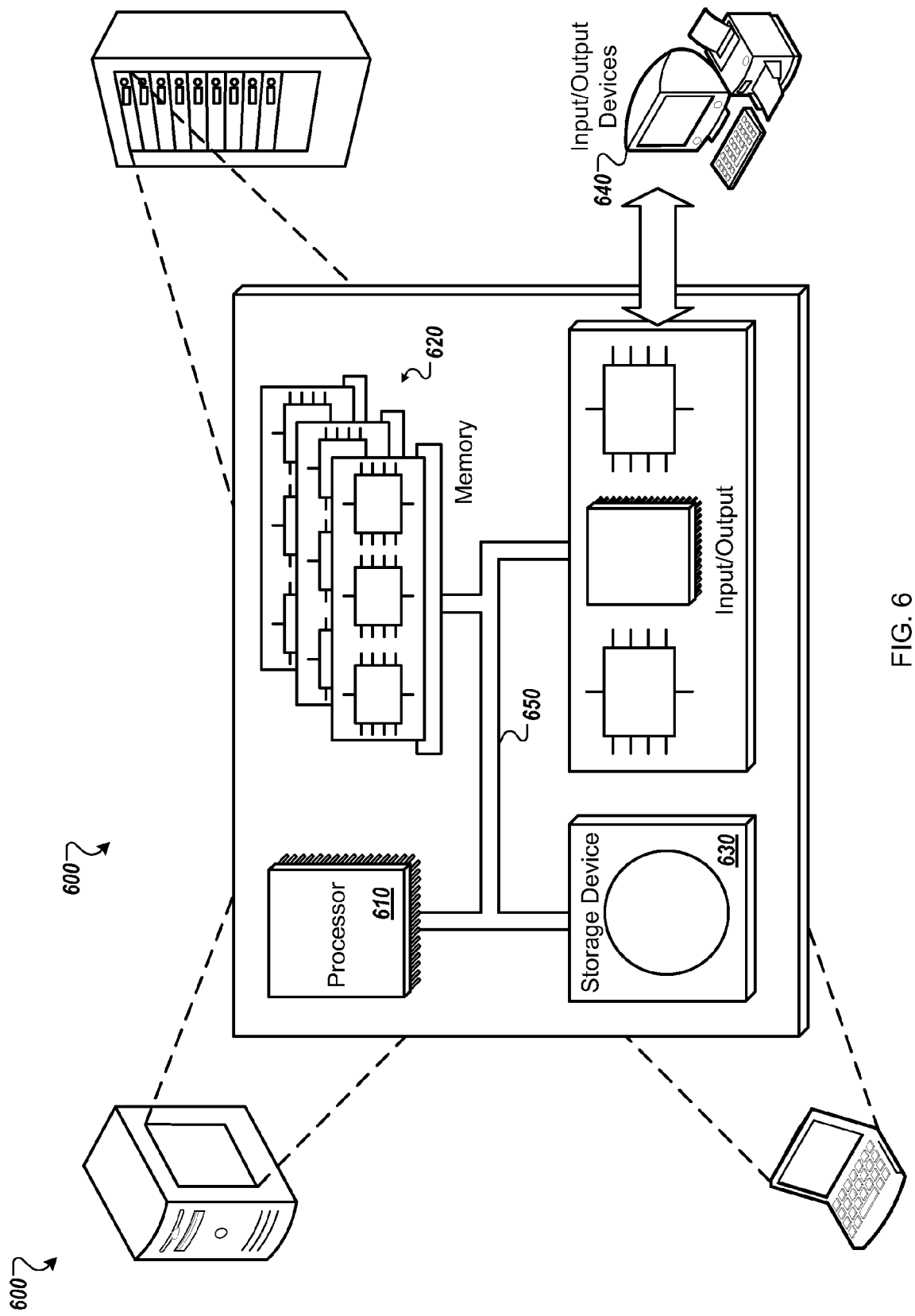
FIG. 6 is a schematic diagram that shows an example of a computing system that can be used in connection with computer-implemented methods and systems described in this document.

FIG. 6 is a schematic diagram that shows an example of a computing system 600. The computing system 600 can be used for some or all of the operations described previously, according to some implementations. The computing system 600 includes a processor 610, a memory 620, a storage device 630, and an input/output device 640. Each of the processor 610, the memory 620, the storage device 630, and the input/output device 640 are interconnected using a system bus 650. The processor 610 is capable of processing instructions for execution within the computing system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the computing system 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the computing system 600. In some implementations, the storage device 630 is a computer-readable medium. In various different implementations, the storage device 630 may be a floppy disk device, a hard disk device, an optical disk device, or a tape device.

The input/output device 640 provides input/output operations for the computing system 600. In some implementations, the input/output device 640 includes a keyboard and/or pointing device. In some implementations, the input/output device 640 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
   identifying a plurality of applications and multiple components, each of the applications in the plurality being associated with one or more of the multiple components that are required for installation of the respective application, and all of the multiple components being organized according to a design hierarchy;
   presenting a graphical user interface that includes a display of (i) a business category user interface element with which a user is able to select the first application, (ii) an installation user interface element that the user can select in order to install a selected application, and (iii) a simulation user interface element that the user can select in order to cause a simulation of an installation of a selected application prior to the actual installation of the application;
   receiving a first user selection of a first application from the plurality of applications;
   determining one or more first components, of the multiple components, that are required for installation of the first application based on the one or more first components being associated with the first application;
   determining one or more first prerequisite applications, of the plurality of applications, that are prerequisites for installation of the first application;
   determining one or more first prerequisite components, of the multiple components, that are required for installation of the one or more first prerequisite applications;
   receiving a second user selection of the simulation user interface element;
   simulating, based on the receiving of the second user selection, an installation of the first application in order to test the installation of the first application for errors;
   determining, based on the simulating, whether the first components and the first prerequisite components will install correctly during an actual installation of the first application; and
   installing, in response to determining that the first components and the first prerequisite components will install correctly, the first components and the first prerequisite components as part of the installation of the first application.

2. The method of claim 1, further comprising:
   receiving a third user selection of a second application from the plurality of applications;
   determining one or more second components, of the multiple components, that are required for installation of the second application based on the one or more second components being associated with the second application;
   determining one or more second prerequisite applications, of the plurality of applications, that are prerequisites for installation of the second application;
   determining one or more second prerequisite components, of the multiple components, that are required for installation of the one or more second prerequisite applications; and
   installing the second components and the second prerequisite components as part of the installation of the second application, the set of the second components and the second prerequisite components being different than the set of the first components and the first prerequisite components.

3. The method of claim 1, wherein:
   the graphical user interface further includes a display of an overwrite user interface element and a merge user interface element that the user can select in order to indicate how an installation of components that are already installed will be handled;
   the method further comprises determining, prior to the installing of the first components and the first prerequisite components, whether the user selected the overwrite user interface element or the merge user interface element; and the installing of the first components and the first prerequisite components further comprises overwriting the components that are already installed based on determining that the user selected the overwrite user interface element.

4. The method of claim 1, wherein:

the graphical user interface further includes a display of an application details user interface element that the user can select in order to view additional details about the selected application; and the method further comprises:
receiving a third user selection of the application details user interface element; and
presenting, in response to receiving the third user selection of the application details user interface element, a second graphical user interface that includes a displayed list of the first components and the first prerequisite components that are required for the installation of the first application.

5. The method of claim 4, wherein the second graphical user interface includes a display of a consistency check user interface element; and wherein the method further comprises:
receiving a fourth user selection of the consistency check user interface element;
performing, in response to receiving the fourth user selection, a consistency check on the first components to determine whether the first components are valid; and
presenting, in response to the performing, a display that identifies a result of the consistency check.

6. The method of claim 1, further comprising:
identifying available systems as possible targets for the installation of the first application; and
receiving a third user selection indicating at least one of the available systems, wherein the first components and the first prerequisite components are installed on the selected available systems.

7. A computer program product tangibly embodied in a non-transitory computer readable storage medium and comprising instructions that when executed by a processor perform a method comprising:
identifying a plurality of applications and multiple components, each of the applications in the plurality being associated with one or more of the multiple components that are required for installation of the respective application, and all of the multiple components being organized according to a design hierarchy;
presenting a graphical user interface that includes a display of (i) a business category user interface element with which a user is able to select the first application, (ii) an installation user interface element that the user can select in order to install a selected application, and (iii) a simulation user interface element that the user can select in order to cause a simulation of an installation of a selected application prior to the actual installation of the application;
receiving a first user selection of a first application from the plurality of applications;
determining one or more first components, of the multiple components, that are required for installation of the first application based on the one or more first components being associated with the first application;
determining one or more first prerequisite applications, of the plurality of applications, that are prerequisites for installation of the first application;
determining one or more first prerequisite components, of the multiple components, that are required for installation of the one or more first prerequisite applications;
receiving a second user selection of the simulation user interface element;
simulating, based on the receiving of the second user selection, an installation of the first application in order to test the installation of the first application for errors;
determining, based on the simulating, whether the first components and the first prerequisite components will install correctly during an actual installation of the first application; and
installing, in response to determining that the first components and the first prerequisite components will install correctly, the first components and the first prerequisite components as part of the installation of the first application.

8. The computer program product of claim 7, wherein the method further comprises:
receiving a third user selection of a second application from the plurality of applications;
determining one or more second components, of the multiple components, that are required for installation of the second application based on the one or more second components being associated with the second application;
determining one or more second prerequisite applications, of the plurality of applications, that are prerequisites for installation of the second application;
determining one or more second prerequisite components, of the multiple components, that are required for installation of the one or more second prerequisite applications; and
installing the second components and the second prerequisite components as part of the installation of the second application, the set of the second components and the second prerequisite components being different than the set of the first components and the first prerequisite components.

9. The computer program product of claim 7, wherein:
the graphical user interface further includes a display of an overwrite user interface element and a merge user interface element that the user can select in order to indicate how an installation of components that are already installed will be handled;
the method further comprises determining, prior to the installing of the first components and the first prerequisite components, whether the user selected the overwrite user interface element or the merge user interface element; and
the installing of the first components and the first prerequisite components further comprises overwriting the components that are already installed based on determining that the user selected the overwrite user interface element.

10. The computer program product of claim 7, wherein:
the graphical user interface further includes a display of an application details user interface element that the user can select in order to view additional details about the selected application; and
the method further comprises:
receiving a third user selection of the application details user interface element; and presenting, in response to receiving the third user selection of the application details user interface element, a second graphical user interface that includes a displayed list of the first components and the first prerequisite components that are required for the installation of the first application.

11. The computer program product of claim 10, wherein the second graphical user interface includes a display of a consistency check user interface element; and
wherein the method further comprises:
receiving a fourth user selection of the consistency check user interface element;
performing, in response to receiving the fourth user selection, a consistency check on the first components to determine whether the first components are valid; and
presenting, in response to the performing, a display that identifies a result of the consistency check.

12. The computer program product of claim 7, wherein the method further comprises:
identifying available systems as possible targets for the installation of the first application; and
receiving a third user selection indicating at least one of the available systems, wherein the first components and the first prerequisite components are installed on the selected available systems.

13. A system comprising:
one or more computers and one or more storage devices storing instructions that are operable, when executed by the one or more computers, to cause the one or more computers to perform operations comprising:
identifying a plurality of applications and multiple components, each of the applications in the plurality being associated with one or more of the multiple components that are required for installation of the respective application, and all of the multiple components being organized according to a design hierarchy;
presenting a graphical user interface that includes a display of (i) a business category user interface element with which a user is able to select the first application, (ii) an installation user interface element that the user can select in order to install a selected application, and (iii) a simulation user interface element that the user can select in order to cause a simulation of an installation of a selected application prior to the actual installation of the application;
receiving a first user selection of a first application from the plurality of applications;
determining one or more first components, of the multiple components, that are required for installation of the first application based on the one or more first components being associated with the first application;
determining one or more first prerequisite applications, of the plurality of applications, that are prerequisites for installation of the first application;
determining one or more first prerequisite components, of the multiple components, that are required for installation of the one or more first prerequisite applications;
receiving a second user selection of the simulation user interface element;
simulating, based on the receiving of the second user selection, an installation of the first application in order to test the installation of the first application for errors;
determining, based on the simulating, whether the first components and the first prerequisite components will install correctly during an actual installation of the first application; and
installing, in response to determining that the first components and the first prerequisite components will install correctly, the first components and the first prerequisite components as part of the installation of the first application.

14. The system of claim 13, wherein the operations further comprise:
receiving a third user selection of a second application from the plurality of applications;
determining one or more second components, of the multiple components, that are required for installation of the second application based on the one or more second components being associated with the second application;
determining one or more second prerequisite applications, of the plurality of applications, that are prerequisites for installation of the second application;
determining one or more second prerequisite components, of the multiple components, that are required for installation of the one or more second prerequisite applications; and
installing the second components and the second prerequisite components as part of the installation of the second application, the set of the second components and the second prerequisite components being different than the set of the first components and the first prerequisite components.

15. The system of claim 13, wherein:
the graphical user interface further includes a display of an overwrite user interface element and a merge user interface element that the user can select in order to indicate how an installation of components that are already installed will be handled;
the operations further comprise determining, prior to the installing of the first components and the first prerequisite components, whether the user selected the overwrite user interface element or the merge user interface element; and
the installing of the first components and the first prerequisite components further comprises overwriting the components that are already installed based on determining that the user selected the overwrite user interface element.

16. The system of claim 13, wherein:
the graphical user interface further includes a display of an application details user interface element that the user can select in order to view additional details about the selected application; and
the operations further comprise:
receiving a third user selection of the application details user interface element; and
presenting, in response to receiving the third user selection of the application details user interface element, a second graphical user interface that includes a displayed list of the first components and the first prerequisite components that are required for the installation of the first application.

17. The system of claim 16, wherein the second graphical user interface includes a display of a consistency check user interface element; and
wherein the operations further comprise:
receiving a fourth user selection of the consistency check user interface element;

performing, in response to receiving the fourth user selection, a consistency check on the first components to determine whether the first components are valid; and presenting, in response to the performing, a display that identifies a result of the consistency check.

18. The system of claim 13, wherein the operations further comprise:

identifying available systems as possible targets for the installation of the first application; and receiving a third user selection indicating at least one of the available systems, wherein the first components and the first prerequisite components are installed on the selected available systems.

* * * * *